(12) United States Patent
Chao et al.

(10) Patent No.: US 8,913,396 B2
(45) Date of Patent: Dec. 16, 2014

(54) CARD HOLDING MECHANISM AND ELECTRONIC DEVICE

(75) Inventors: Cheng-Yi Chao, New Taipei (TW); Zuo-Dong Li, Shenzhen (CN); Xiao-Hui Qin, Shenzhen (CN); Zhen-Cun Lu, Shenzhen (CN); Jian-Feng Fan, Shenzhen (CN); Yong-Hua Wang, Shenzhen (CN); Zheng-Wei Liu, Shenzhen (CN); Chih-Chieh Huang, New Taipei (TW); Chung-Yuan Chen, New Taipei (TW); Shi-Yong Huang, Shenzhen (CN); Huan Ren, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 328 days.

(21) Appl. No.: 13/495,141

(22) Filed: Jun. 13, 2012

(65) Prior Publication Data

US 2013/0063910 A1    Mar. 14, 2013

(30) Foreign Application Priority Data

Sep. 9, 2011    (CN) .......................... 2011 1 0267352

(51) Int. Cl.
| | |
|---|---|
| *H05K 5/00* | (2006.01) |
| *G06F 1/16* | (2006.01) |
| *H04M 1/02* | (2006.01) |
| *H04B 1/38* | (2006.01) |
| *G06K 13/08* | (2006.01) |

(52) U.S. Cl.
CPC ............. *G06F 1/1656* (2013.01); *H04M 1/026* (2013.01); *H04B 1/3816* (2013.01); *G06K 13/0831* (2013.01); *G06K 13/085* (2013.01)
USPC ...................... 361/754; 361/679.32; 361/727

(58) Field of Classification Search
USPC ............... 361/754, 727, 737, 679.32, 679.33; 455/575.1–575.3
See application file for complete search history.

(56) References Cited

U.S. PATENT DOCUMENTS

| | | | | | |
|---|---|---|---|---|---|
| 5,655,917 | A | * | 8/1997 | Kaneshige et al. | 439/155 |
| 6,035,216 | A | * | 3/2000 | Cheng et al. | 455/558 |
| 7,184,274 | B2 | * | 2/2007 | Wu et al. | 361/752 |
| 7,837,092 | B2 | * | 11/2010 | Wen | 235/375 |
| 7,837,486 | B2 | * | 11/2010 | Li | 439/159 |
| 8,185,920 | B2 | * | 5/2012 | Wang et al. | 720/646 |
| 8,462,514 | B2 | * | 6/2013 | Myers et al. | 361/754 |

* cited by examiner

*Primary Examiner* — Hung S Bui
(74) *Attorney, Agent, or Firm* — Novak Druce Connolly Bove + Quigg LLP

(57) ABSTRACT

An electronic device includes a housing, and a card holding mechanism for holding an electronic card. The housing defines a through hole, and the card holding mechanism may be inserted into the housing via the through hole. The card holding mechanism includes a tray for receiving the electronic card, an operating component, and a transmission component. The operating component moves from a latched position to an unlatched position, the transmission component is driven by the operating component to rotate and drive the tray to eject from the housing.

20 Claims, 6 Drawing Sheets

US 8,913,396 B2

CARD HOLDING MECHANISM AND ELECTRONIC DEVICE

BACKGROUND

1. Technical Field

The present disclosure relates to a card holding mechanism; and particularly, to an electronic device using the card holding mechanism.

2. Description of Related Art

Electronic devices, such as mobile phones, and notebook computers may employ at least one electronic card (e.g., SIM card, SD card) for storing information, connecting to the internet, and dialing calls, for example. It is necessary to provide a card holding mechanism for holding/securing the electronic card within the electronic device. Typical card holding mechanisms may define a receiving space, and an elastic sheet fitted in the receiving space. The electronic card can be received and held in the receiving space. When detaching or replacing the electronic card, a user must detach the outer cover from the electronic device to expose the card holding mechanism, thus, removal and replacement of the electronic card is inconvenient.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
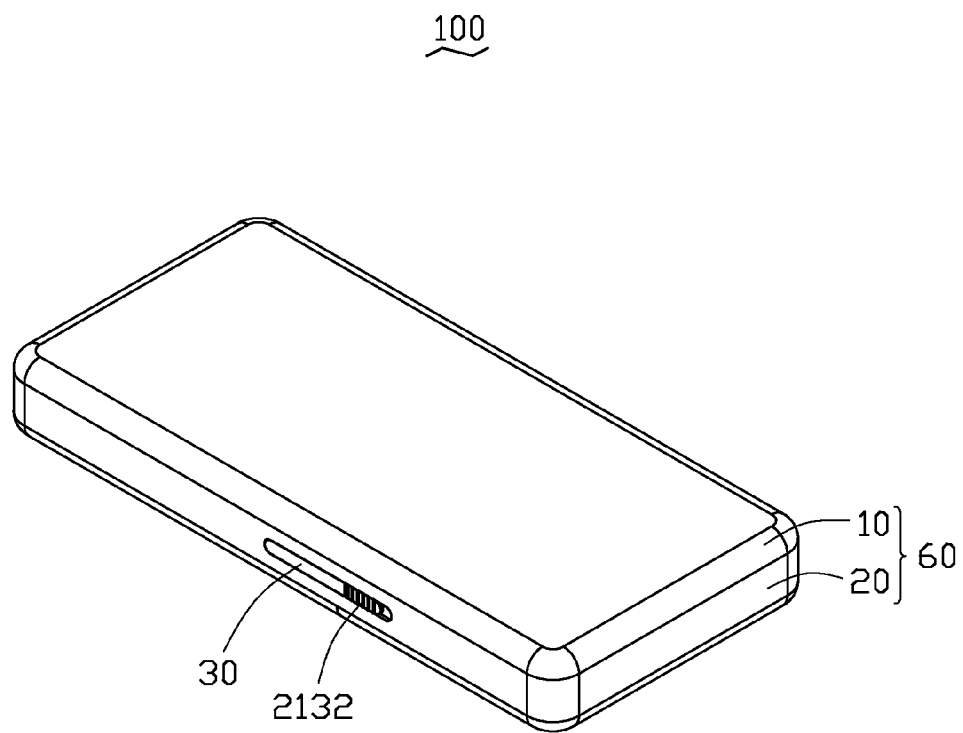
FIG. 1 is an isometric view of an embodiment of an electronic device having a card holding mechanism.

FIG. 1, is an embodiment of an electronic device 100. The electronic device 100 includes an upper cover 10, a lower cover 20 connecting to the upper cover 10, and a card holding mechanism 30. The upper cover 10 and the lower cover 20 cooperatively form a housing 60 with a receiving space (not shown). The card holding mechanism 30 is received in the receiving space and is used for holding/securing an electronic card 40 (shown in FIG. 2). The electronic device 100 may be a mobile phone, a notebook computer, or other electronic devices. The electronic card 40 may be one of various types of cards such as a secure digital memory card (SD Card), a subscriber identification module card (SIM Card). In the illustrated embodiment, the electronic device 100 is a mobile phone, and the card 40 is a SIM card.

Figure 2:
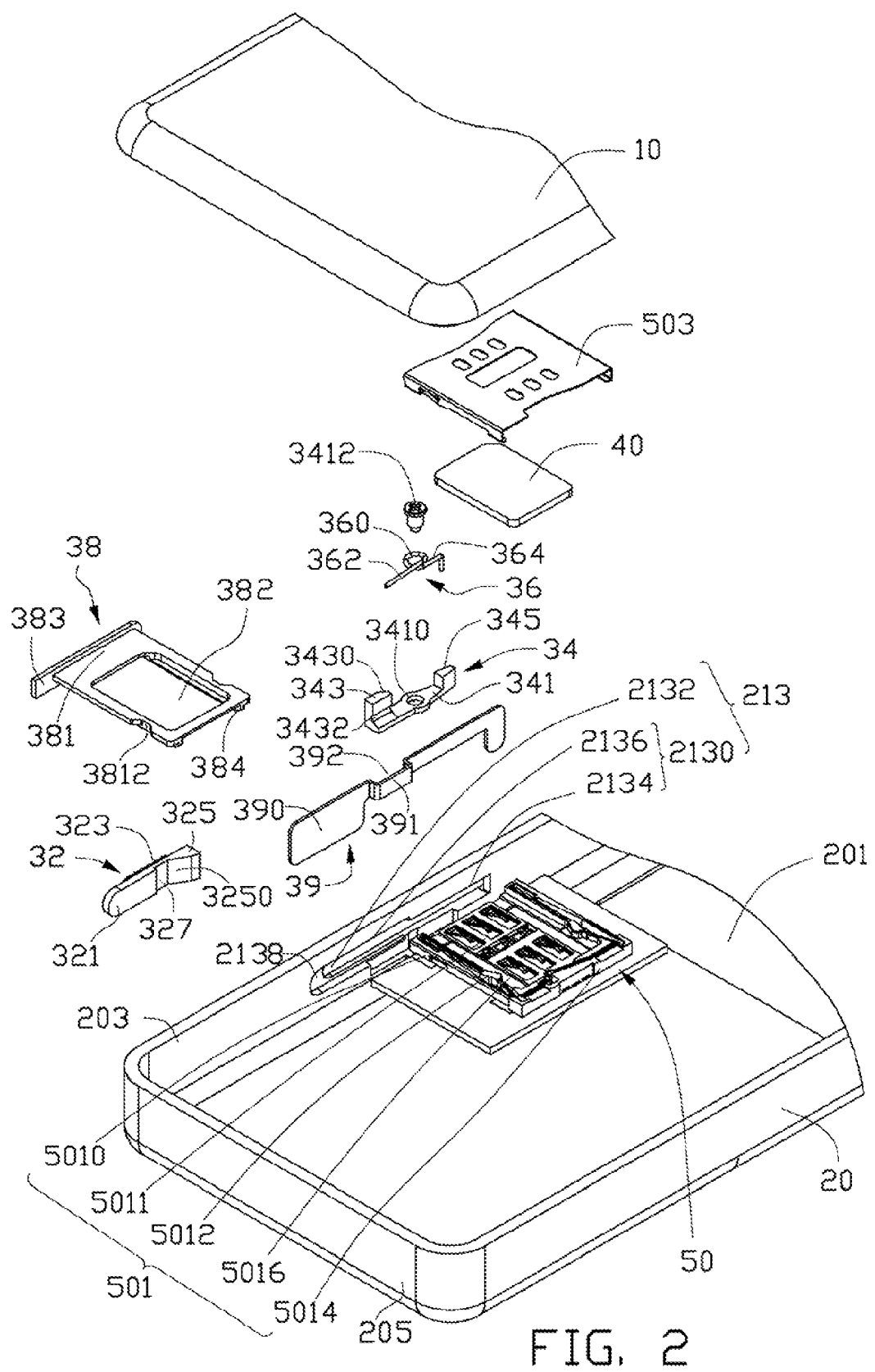
FIG. 2 is a partial, exploded view of the electronic device of FIG. 1.

Referring to FIG. 2, the lower cover 20 includes a base 201, a first sidewall 203, and a second sidewall 205 perpendicularly connected to the first sidewall 203. The first sidewall 203 and the second sidewall 205 perpendicularly extend from two rims of the base 201.

The first sidewall 203 defines a stepped through hole 213 for allowing insertion of the card holding mechanism 30. The stepped through hole 213 is substantially a narrow strip-shaped and extends in the lengthwise direction of the first sidewall 203. The stepped through hole 213 includes a first receiving part 2130 and a second receiving part 2132 communicating with the first receiving part 2130. When viewed from the outer surface of the first sidewall 203, the second receiving part 2132 is visible, and the first receiving part 2130 is hidden, such as illustrated in FIG. 1.

The first receiving part 2130 includes a first portion 2134 and a second portion 2136. The vertical width of the first portion 2134 is substantially equal to that of the second receiving part 2132. The distance between an end of the first portion 2134 away from the second portion 2136 and the second sidewall 205, is less than the distance between a corresponding end of the second receiving part 2132 and the second sidewall 205, thus, there is a first stepped wall 2137 (shown in FIG. 5) formed at the boundary between the corresponding end of the first portion 2134 and the second receiving part 2132. The vertical width of the second portion 2136 is larger than that of the second receiving part 2132. The distance between an end of the second portion 2136 away from the first portion 2134 and the second sidewall 205, is less than the distance between a corresponding end of the second receiving part 2132 and the second sidewall 205, thus, there is a second stepped wall 2138 formed at the boundary between the corresponding end of the first portion 2134 and the second receiving part 2132.

A connector 50 is positioned on an inner surface of the base 201 and is arranged adjacent to the first portion 2134 of the first receiving part 2130. The connector 50 includes a main body 501 and a cover sheet 503. The main body 501 includes two sides 5010 spaced from each other, a support portion 5011, two elastic plates 5012, and a retaining portion 5014. The support portion 5011 is substantially square-shaped, and is secured to the base 201. The two sides 5010 are formed at two opposite sides of the support portion 5011 and are perpendicular to the first sidewall 203. The retaining portion 5014 is connected between two same ends of the two sides 5010 away from the first sidewall 203, thus, the support portion 5011, two sides 5010, and the retaining portion 5014 cooperatively define a mounting space (not label) for receiving the electronic card 40. The mounting space communicates with the stepped through hole 213. Two sliding slots 5016 are defined on the support portion 5011, and are parallel to the corresponding side 5010. The two elastic plates 5012 are positioned on the corresponding side 5010, and are symmetrical with each other.

The card holding mechanism 30 includes an operating component 32, a transmission component 34, an elastic member 36, a tray 38, and a fixing plate 39. The operating component 32 is slidably installed on the first sidewall 203 and is received in the stepped through hole 213. The operating component 32 includes a plate body 321, an operating portion 323, an abutting portion 325, and a depression 327. The plate body 321 is substantially narrow strip-shaped. The width of the plate body 321 matches with the second portion 2136 of the first receiving part 2130. The operating portion 323 protrudes from a surface of the plate body 321, and the width matches with the second receiving part 2132. The abutting portion 325 protrudes from a surface of the plate body 321 opposite to the operating portion 323. The abutting portion 325 defines an inclined surface 3250. The depression 327 is formed in the middle of the plate body 321 and connects with the abutting portion 325.

The transmission component 34 is secured to the inner surface of the base 201 and is arranged adjacent to the first sidewall 203. The transmission component 34 includes a connection shaft 341, a first engaging portion 343, and a pushing portion 345. The middle of the connection shaft 341 defines a fixing hole 3410 for insertion of a fixing member 3412. The first engaging portion 343 and the pushing portion 345 protrude from opposite ends of the connection shaft 341. The first engaging portion 343 defines an engaging surface 3430. In the illustrated embodiment, the engaging surface 3430 is an inclined surface engaging with the inclined surface 3250. An end of the first engaging 343 opposite to the first sidewall 203 defines a slot 3432.

The elastic member 36 is a torsion spring in the illustrated embodiment. The elastic member 36 includes a hollow circular mounting portion 360, a first elastic arm 362, and a second elastic arm 364. The first elastic arm 362 and the second elastic arm 364 extend from opposite ends of the mounting portion 360. The first elastic arm 362 is received in the slot 3432. The second elastic arm 364 is substantially L-shaped and is fixed to the base 201.

The tray 38 may be inserted into the mounting space of the connector 50 via the stepped through hole 213. The tray 38 includes a tray body 381, a draw-off portion 383 formed at an end of the tray body 381, two sliding rails 384, and a second engaging portion 385 (shown in FIG. 4). The tray body 381 is substantially rectangular, and defines an accommodating groove 382 for receiving the electronic card 40. Two latching grooves 3812 are defined on two sides of the tray body 381 perpendicular to the first sidewall 203, for engaging with the two elastic plates 5012. The two sliding rails 384 protrude from opposite sides of the accommodating groove 382 and are perpendicular to the draw-off portion 383.

The draw-off portion 383 is bar-shaped and has dimensions substantially the same as those of the second receiving part 2132. The second engaging portion 385 protrudes from the middle of the draw-off portion 383 and extends toward the tray body 381 for engaging with the pushing portion 345.

The fixing plate 39 is mounted on the inner surface of the first sidewall 203 around the first receiving part 2130. The fixing plate 39 includes a plate 390, and a restriction portion 391. The restriction portion 391 protrudes from the middle of the plate 390 to define an accommodating space 392 for receiving the abutting portion 325.

Figure 3:
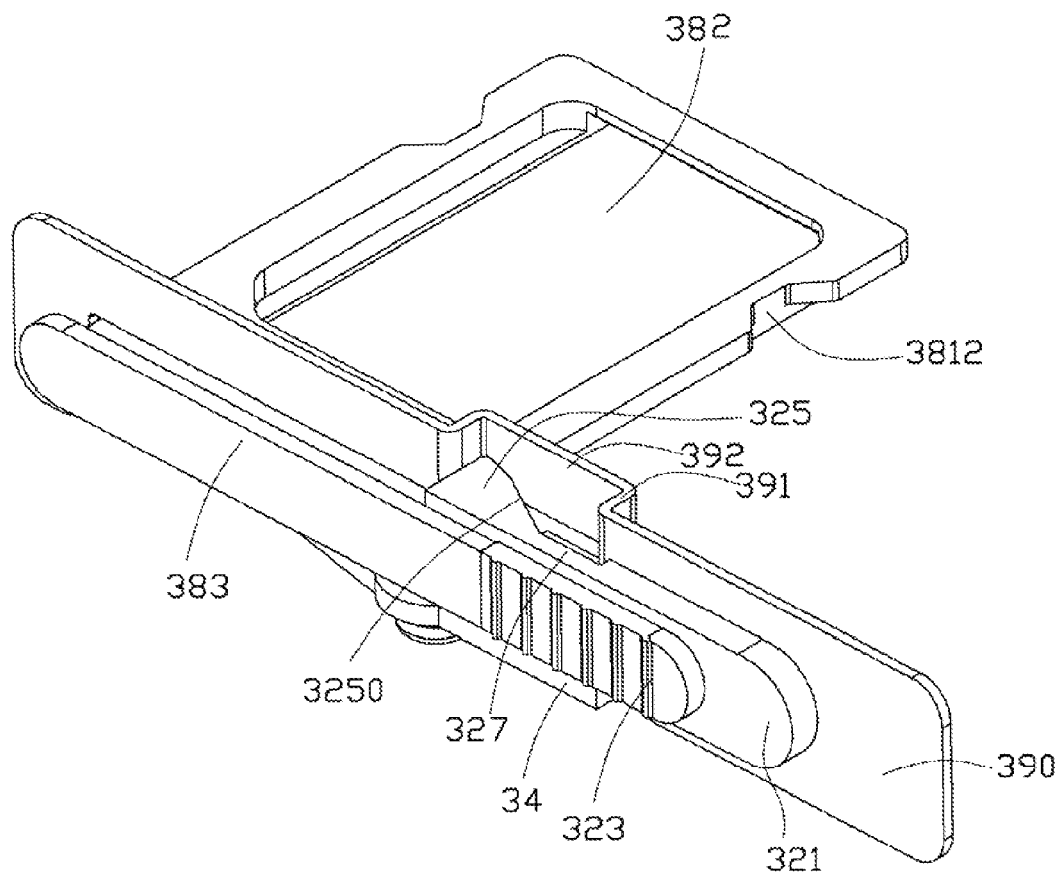
FIG. 3 is a perspective view of the card holding mechanism of FIG. 1.
Figure 4:
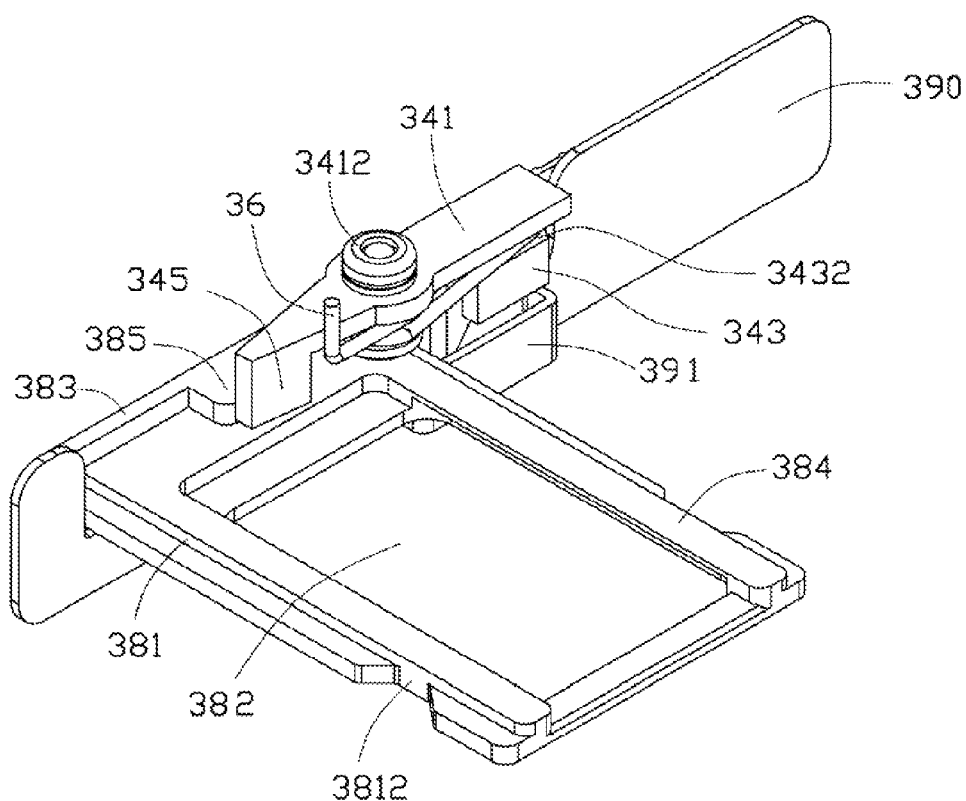
FIG. 4 is similar to FIG. 3, but viewed from another aspect.

Referring to FIGS. 3 and 4, in assembly, the operating component 32 is slidably mounted on the first sidewall 203, and the plate body 321 is sandwiched between two opposite sides of the second portion 2136 to enable the operating component 32 to slide in a direction parallel to the first sidewall 203. The operating portion 323 extends through the second receiving part 2132, and is exposed out of the first sidewall 203. The fixing plate 39 is secured to the inner surface of the first sidewall 203 using any suitable approach, for example, welding, gluing or using a fastener. A part of the abutting portion 325 is received in the accommodating space 392 to prevent the operating component 32 from detaching from the first sidewall 203 in a direction perpendicular to the first sidewall 203, when an external force is applied to the operating component 32.

The mounting portion 360 of the elastic member 36 is aligned with the fixing hole 3410 of the transmission component 34. The fixing member 3412 is extended through the mounting portion 360 and the fixing hole 3410, for fixing the transmission component 34 and the elastic member 36 to the base 201. The first elastic arm 362 is received in the slot 3432, and the second elastic arm 364 is secured to the base 201. The first engaging portion 343 is received in the depression 327, with the engaging surface 3430 resisting the inclined surface 3250.

An end of the tray body 381 opposite to the draw-off portion 383 is extended through the second receiving part 2132 and the first portion 2134 of the first receiving part 2130. The sliding rails 384 slide along the sliding slots 5016 until the draw-off portion 383 is stopped by the second receiving part 2132. Two elastic plates 5012 engage with the corresponding latching groove 3812 for latching the tray 38 to the connector 50. In this state, the tray body 381 is received in the mounting space of the connector 50. One end of the draw-off portion 383 resists the first stepped wall 2137, and the other opposite end thereof resists an end of the operating portion 323 away from the sidewall 205. As a result, the second receiving part 2132 is fully closed by the operating component 32 and the draw-off portion 383 for preventing penetration by dust and other contaminants. The cover sheet 503 is mounted on the tray body 381, and covers the accommodating groove 3814.

In this state, the operating component 32 is movable between a latched position for retaining the tray 38 in the electronic device 100 and an unlatched position where the tray 38 is ejected from the electronic device 100. When the operating component 32 is in the latched position, an end of the operating portion 323 adjacent to the second sidewall 205 resists the stepped wall 2138 and keeps a distance from the corresponding end of the second receiving part 2132, such as illustrated in FIG. 1, for allowing the operating component 32 to slide along the second receiving part 2132. When the operating component 32 is in the unlatched portion, an end of the operating portion 323 adjacent to the second sidewall 205 is stopped by the corresponding end of the second receiving part 2132, such as illustrated in FIG. 6.

Figure 5:
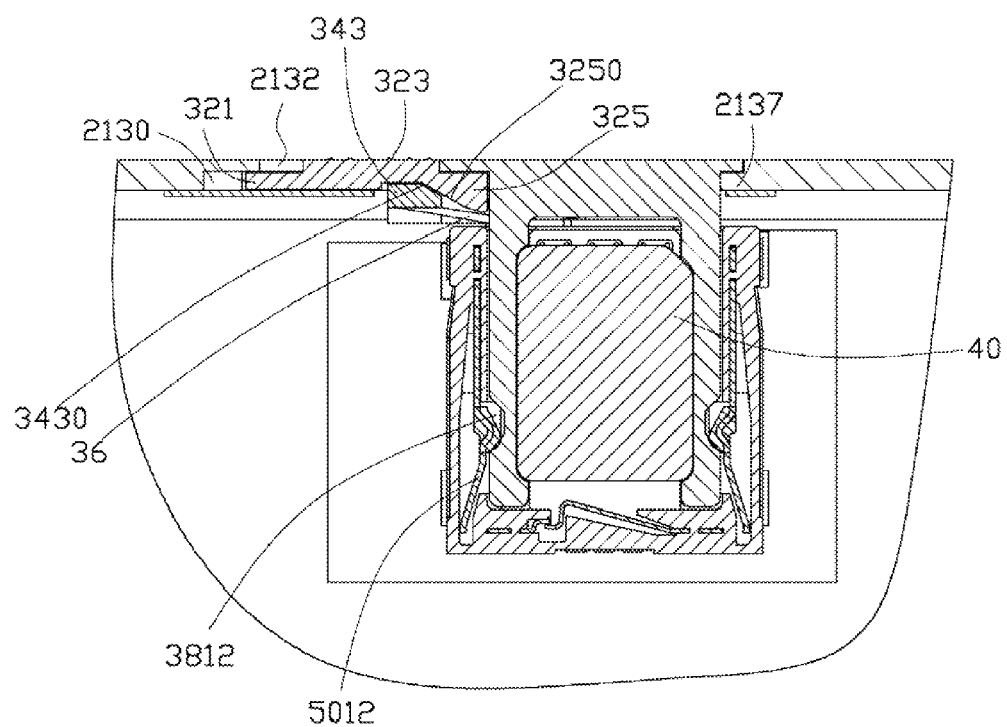
FIG. 5 is a cross-sectional view showing the card holding mechanism of FIG. 1 in a first state of use.
Figure 6:
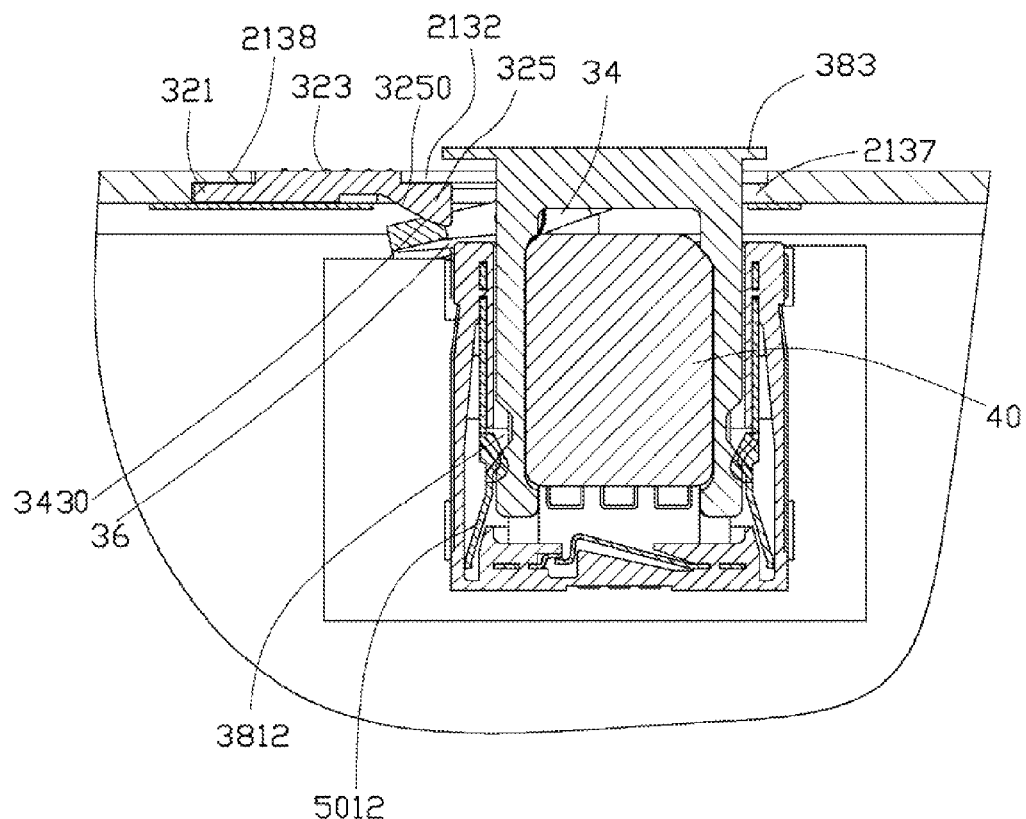
FIG. 6 is similar to FIG. 5, but showing the card holding mechanism in another state of use.

Referring to FIGS. 5 and 6, to eject the tray 38 from the first sidewall 203, the operating component 32 is pushed away from the tray 38 along the second receiving part 2132, the inclined surface 3250 slides relative to the engaging surface 3430 to drive the first engaging portion 343 to rotate in a first direction away from and perpendicular to the first sidewall 203. As a result, the pushing portion 345 is rotated in a second direction reverse to the first direction and pushes the second engaging portion 385 to eject the tray 38 out of the first sidewall 203. At the same time, the first elastic arm 362 of the elastic member 36 is twisted with the first engaging portion 343 to generate restoring forces. When an end of the operation portion 323 adjacent to the second sidewall 205 is stopped by the second stepped wall 2138, the draw-off portion 383 of the tray 38 is fully ejected out of the second receiving part 2132. The pair of elastic plates 5012 disengage from the two latching grooves 3812, thus, the tray 38 can slide out from the stepped through hole 213. Inserting the electronic card 40 into and removing the electronic card 40 from the tray 38 becomes very easy.

When manually pushing the tray 38 to slide into the lower cover 20, the second engaging portion 385 resists the pushing portion 345 to rotate away from the first sidewall 203. The transmission component 34 is driven to rotate via the restoring force generated by the elastic member 36. Since the engaging surface 3430 of the transmission component 34 slides relative to the inclined surface 3250 of the operating component 32, a pushing force is applied to the abutting portion 325 for driving the operating component 32 to move from the unlatched position to the latched position. When the tray 38 is fully inserted into the first sidewall 203, the operating component 32 recovers to the latched position.

Although information and the advantages of the present embodiments have been set forth in the foregoing description, together with details of the structures and functions of the present embodiments, the disclosure is illustrative only; changes may be made in detail, especially in the matters of shape, size, and arrangement of parts within the principles of the present embodiments to the full extent indicated by the broad general meaning of the terms in which the appended claims are expressed.

What is claimed is:

1. An electronic device, comprising:
a housing comprising a sidewall, the sidewall defining a through hole; and
a card holding mechanism being received in the housing, the card holding mechanism comprising:
a tray for receiving an electronic card, and capable of being ejected from the housing via the through hole;
an operating component capable of moving between a latched position and an unlatched position; and
a transmission component arranged between the operating component and the tray;
wherein the operating component moves from the latched position to the unlatched position along a direction parallel with the sidewall and drives the transmission component to rotate, driving the tray to eject from the housing simultaneously, such that the electronic card received in the tray can be taken out.

2. The electronic device as claimed in claim 1, wherein when the tray is pushed into the housing, the tray drives the transmission component to rotate and drive the operating component moving from the unlatched position to the latched position.

3. The electronic device as claimed in claim 2, wherein the card holding mechanism further comprises an elastic member, the elastic member is compressed by the transmission component to generate restoring forces when the operating component moves from the latched position to the unlatched position; the transmission component is driven to rotate via the restoring force generated by the elastic member and drive the operating component to move from the unlatched position to the latched position.

4. The electronic device as claimed in claim 3, wherein the elastic member comprises a mounting portion, a first elastic arm and a second elastic arm; the first and second elastic arms are respectively extended from opposite ends of the mounting portion; the first elastic arm contacts with the transmission component and the second elastic arm contacts with the housing.

5. The electronic device as claimed in claim 1, wherein the operating component comprises an abutting portion with an inclined surface and a depression adjacent to the abutting portion; the transmission component comprises a first engaging portion with an engaging surface; the first engaging portion received in the depression with the engaging surface resisting the inclined surface; the inclined surface is capable of sliding relative to the engaging surface and pushing the first engaging portion to rotate when the operating component being moved from the latched position to the unlatched position.

6. The electronic device as claimed in claim 5, wherein the transmission component comprises a pushing portion opposite to the first engaging portion; when the operating component moves between the latched portion and the unlatched position, the first engaging portion rotates in a first direction, and the pushing portion rotates in a second direction reverse to the first direction.

7. The electronic device as claimed in claim 6, wherein the tray comprises a second engaging portion corresponding to the pushing portion, the pushing portion is capable of resisting the second engaging portion.

8. The electronic device as claimed in claim 6, wherein the card holding mechanism comprises a fixing plate installed on the inner surface of the sidewall, the fixing plate is used for preventing the operating component detaching from the housing.

9. The electronic device as claimed in claim 8, wherein the fixing plate comprises a restriction portion defining an accommodating space, the abutting portion receives in the accommodating space and resists the restriction portion for preventing the operating component detaching from the housing in the direction parallel to the first direction.

10. The electronic device as claimed in claim 6, wherein the operating component comprises a plate body, the plate body is sandwiched between two opposite sides of the through hole to enable the operating component to move in the direction perpendicular to the first direction.

11. The electronic device as claimed in claim 10, wherein the operating component comprises an operating portion, the operating portion and the abutting portion posited on two opposite surfaces of the plate body, the operating portion extends through the through hole and exposes out of the sidewall.

12. A card holding mechanism, received in a housing of an electronic device for holding an electronic card, the card holding mechanism comprising:
a tray for receiving an electronic card, and capable of being ejected from the housing;
an operating component capable of moving between a latched position and an unlatched position; and
a transmission component arranged between the operating component and the tray;
wherein the operating component moves from the latched position to the unlatched position along a direction parallel with the sidewall and drives the transmission component to rotate, driving the tray to eject from the housing simultaneously, such that the electronic card received in the tray can be taken out.

13. The electronic device as claimed in claim 12, wherein when the tray is pushed into the housing, the tray drives the transmission component to rotate and drive the operating component moving from the unlatched position to the latched position.

14. The electronic device as claimed in claim 13, wherein the card holding mechanism further comprises an elastic member, the elastic member is compressed by the transmission component to generate restoring forces when the operating component moves from the latched position to the unlatched position; the transmission component is driven to rotate via the restoring force generated by the elastic member and drive the operating component to move from the unlatched position to the latched position.

15. The electronic device as claimed in claim 14, wherein the elastic member comprises a mounting portion, a first elastic arm and a second elastic arm; the first and second elastic arms are respectively extended from opposite ends of the mounting portion; the first elastic arm contacts with the transmission component, and the second elastic arm contacts with the housing.

16. The electronic device as claimed in claim 12, wherein the operating component comprises an abutting portion with an inclined surface and a depression adjacent to the abutting portion; the transmission component comprises a first engaging portion with an engaging surface; the first engaging portion received in the depression with the engaging surface resisting the inclined surface; the inclined surface is capable of sliding relative to the engaging surface and pushing the first engaging portion to rotate when the operating component being moved from the latched position to the unlatched position.

17. The electronic device as claimed in claim 16, wherein the transmission component comprises a pushing portion opposite to the first engaging portion; when the operating component moves between the latched portion and the unlatched position, the first engaging portion rotates in a first direction, and the pushing portion rotates in a second direction reverse to the first direction.

18. The electronic device as claimed in claim 17, wherein the tray comprises a second engaging portion corresponding to the pushing portion, the pushing portion is capable of resisting the second engaging portion.

19. The electronic device as claimed in claim 17, wherein the card holding mechanism comprises a fixing plate installed on the inner surface of the sidewall, the fixing plate is used for preventing the operating component detaching from the housing.

20. The electronic device as claimed in claim 19, wherein the fixing plate comprises a restriction portion defining an accommodating space, the abutting portion receives in the accommodating space and resists the restriction portion for preventing the operating component detaching from the housing in the direction parallel to the first direction.

\* \* \* \* \*